United States Patent
Fujimoto et al.

[11] Patent Number: 6,141,991
[45] Date of Patent: Nov. 7, 2000

[54] PRESS MOLDING APPARATUS FOR GLASS OPTICAL ELEMENTS AND MOLDING METHOD FOR GLASS OPTICAL ELEMENTS

[75] Inventors: Tadayuki Fujimoto; Shinichiro Hirota; Kishio Sugawara; Shinji Hada, all of Tokyo, Japan

[73] Assignee: Hoya Corporation, Tokyo, Japan

[21] Appl. No.: 09/247,096

[22] Filed: Feb. 9, 1999

Related U.S. Application Data

[63] Continuation-in-part of application No. 09/075,791, May 12, 1998, abandoned.

[30] Foreign Application Priority Data

May 13, 1997 [JP] Japan ................................ 9-122153

[51] Int. Cl.⁷ .................................................. C03B 11/12
[52] U.S. Cl. ............................ 65/29.19; 65/103; 65/122; 65/127; 65/162; 65/223; 65/226; 65/246; 65/275; 65/319; 65/323; 425/344; 425/808
[58] Field of Search ............................... 65/64, 102, 103, 65/122, 127, 222, 223, 225, 226, 246, 275, 319, 323; 425/808, 344

[56] References Cited

U.S. PATENT DOCUMENTS

| | | | |
|---|---|---|---|
| 270,526 | 1/1883 | Werts | 65/64 |
| 1,269,186 | 6/1918 | Johanson | 65/64 |
| 4,929,265 | 5/1990 | Carpenter et al. | 65/64 |
| 5,346,522 | 9/1994 | Komiyama et al. | 65/64 |
| 5,417,730 | 5/1995 | Shigyo et al. | 65/111 |

FOREIGN PATENT DOCUMENTS

| | | |
|---|---|---|
| 63-170225 | 7/1988 | Japan . |
| 64-42334 | 2/1989 | Japan . |
| 64-45736 | 2/1989 | Japan . |
| 5-270847 | 10/1993 | Japan . |
| 7-33452 | 2/1995 | Japan . |
| 8-133758 | 5/1996 | Japan . |

*Primary Examiner*—Sean Vincent
*Attorney, Agent, or Firm*—Burns, Doane, Swecker & Mathis, L.L.P.

[57] ABSTRACT

Disclosed are a molding apparatus for glass optical elements a plurality of molds each constituted of an upper mold and a lower mold, a matrix supporting the molds, and heating means wound around the matrix for heating the molds, wherein the matrix extends in a longitudinal form and has a constant width, wherein the plurality of the molds are arranged in the matrix in a line so that the center of each mold is located on a center line of the matrix, and wherein a distance between the heating means and the matrix is constant at least at an edge of the matrix in a transverse direction, and a molding method for optical elements comprising the steps of: softening a plurality of glass material pieces by heat; and making a simultaneous press molding of the glass material pieces with a plurality of molds, constituted of upper and lower molds, arranged in a longitudinal form matrix, in a line extending in a longitudinal direction, wherein each mold is heated by thermal conductance from the matrix heated by heating means wound around the matrix, to heat at least substantially equally two opposite positions in a horizontal cross section of each mold. By the press molding apparatus and the press molding method according the invention, the press molding is performed upon heating uniformly a plurality of molds, thereby manufacturing glass optical elements having a good surface precision and a good surface quality.

24 Claims, 11 Drawing Sheets

(a)

(b)

落下

(a)

(b)

PRESS MOLDING APPARATUS FOR GLASS OPTICAL ELEMENTS AND MOLDING METHOD FOR GLASS OPTICAL ELEMENTS

RELATED APPLICATION

This application is a continuation-in-part of U.S. application Ser. No. 09/075,791, filed May 12, 1998 now abandoned.

BACKGROUND OF THE INVENTION

A method for molding glass optical elements, such as high precision lenses, using a mold made from a precisely fabricated mold material, to which softened glass does not adhere and which can be finished to an optical surface, has drawn attentions recently and been developed in a various way. With this method, a simultaneous pressing process for producing plural glass optical elements using plural molds has been researched to improve the productivity of the method. For example, Japanese Unexamined Patent Publication (KOKAI) Showa, No. 63-170,225 discloses a method including the steps of, where four sets of upper and lower cavity dies are arranged in a disc-shaped mold consisted of an upper half and a lower half so that centers of the cavity dies are radially located with the same radius from the center of the mold in being spaced equally from each other, setting a glass material to be molded on each lower cavity die, subjecting the mold to induction heating using induction heating coils wound around mold edges, and heating the cavity dies and the glass material by thermal conductance from the mold to press the glass.

Meanwhile, Japanese Unexamined Patent Publication (KOKAI) Heisei, No. 7-33,452, proposes a molding apparatus for optical elements, as shown in FIG. 12, in which heaters 507 arranged parallel to upper mold halves 502 and lower mold halves 503, which are arranged in series for molding glass materials, heats a shell frame 501 incorporating the upper and lower mold halves 502, 503 to implement a press molding.

To press glass optical elements such as high precision lenses, it is important to make uniform the temperature of the molding surface on the mold, and for instance, such molding needs a temperature profile within 2 or 3° C. The method, disclosed in the above Publication No. 63-170,225, however, creates a temperature profile high at the edge and low at the center of the mold, because the mold edge first receives the induction heating and its heat then conducts in a mold center direction to increase the temperature of the whole mold, and therefore, the molding surface on the cavity die has a temperature profile high at the edge and low at the center of the mold. As a result, the molding material expands on an edge side of the mold, thereby raising a problem that the material comes out of the cavity die. On the center side of the mold, conversely, the material does not so expand, causing possible production of defective articles. Moreover, there raises a problem that the molded articles easily sustain irregularity due to such a temperature profile.

The apparatus disclosed in Japanese Unexamined Patent Publication Heisei, No. 7-33,452 heats the two molds disposed parallel by heating the shell frame using the parallel heaters as shown in FIG. 12. Therefore, the molds are subject to a high temperature on the heater sides and a low temperature on the center of the shell frame, thereby raising the same problem as above. The apparatus of the Patent No. 7-33, 452 not always has a short cycle for molding process, because the molds and glass materials are heated at its heating zone, though the glass material can be automatically supplied and the molded articles are delivered in a sealed chamber.

SUMMARY OF THE INVENTION

It is an object of the invention to solve the above problems and to provide an apparatus and a method for press molding capable of manufacturing glass optical elements having a high surface precision and a surface quality upon press molding where plural molds are uniformly heated.

With this invention, to solve the above problem, a molding apparatus for glass optical elements includes a plurality of molds each constituted of an upper mold and a lower mold, a matrix supporting the molds, and a heating means wound around the matrix for heating the molds, wherein the matrix extends in a longitudinal form and has a constant width, wherein the molds are arranged in the matrix in a line in a longitudinal direction as spaced from each other with a constant interval so that the center of each mold is located on a center line of the matrix, and wherein a distance between the heating means and the matrix is constant at least at an edge of the matrix in a transverse direction.

In another aspect of the invention, a molding method for optical elements includes the steps of softening a plurality of glass material pieces by heat, and making a simultaneous press molding of the glass material pieces with a plurality of molds, constituted of upper and lower molds, arranged in a longitudinal form matrix, in a line extending in a longitudinal direction, wherein each mold is heated by thermal conductance from the matrix heated by heating means wound around the matrix, to heat at least substantially equally two opposite positions in a horizontal cross section of each mold.

DETAILED DESCRIPTION OF THE INVENTION

Figure 1:
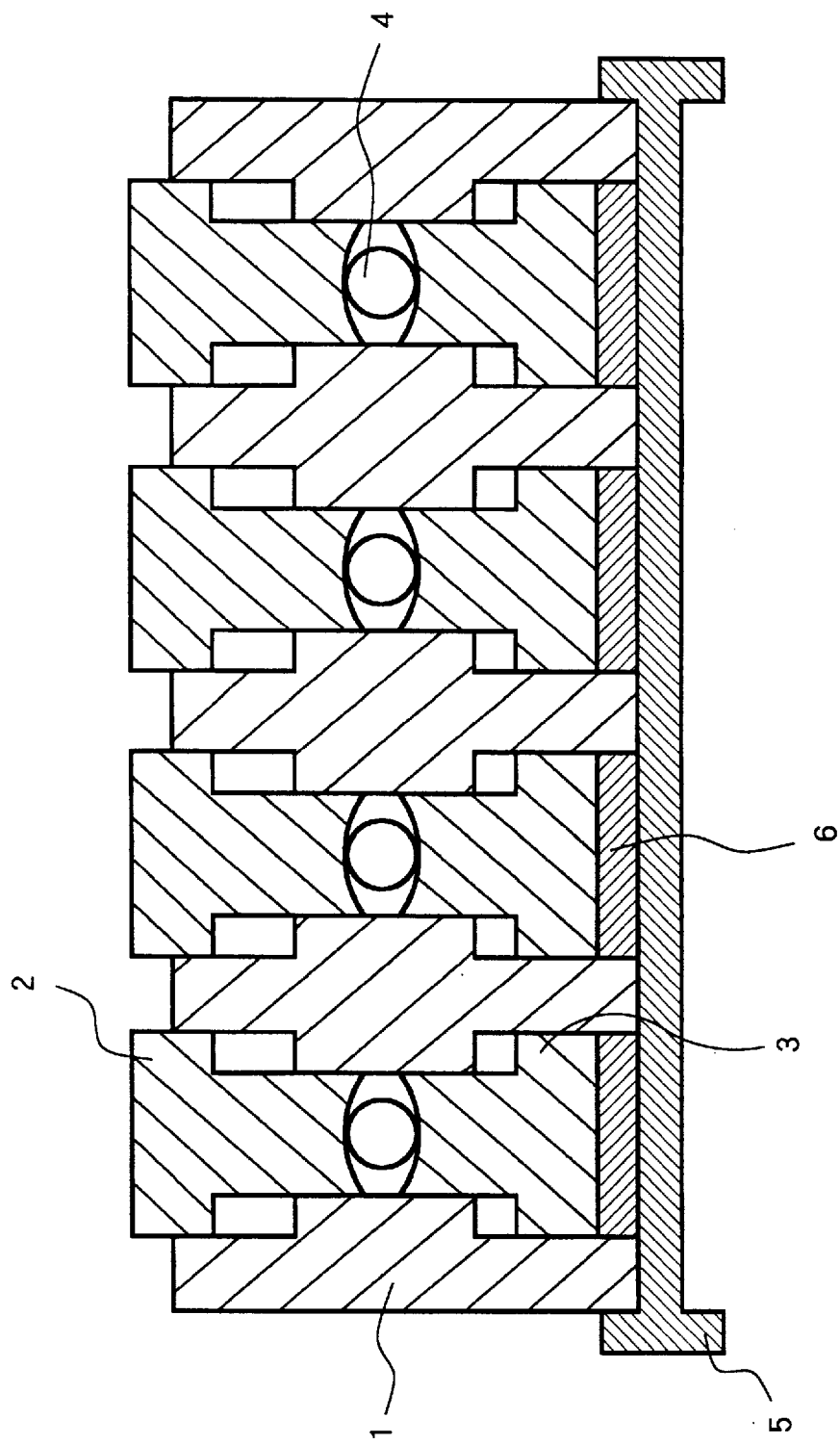
FIG. 1 is a cross section showing an assembled state of a press molding apparatus according to an embodiment of the invention.

Hereinafter, embodiments of the invention will be described.

The molding apparatus according to the invention has a feature that a matrix for supporting molds extends in a longitudinal form and has a constant width, that the plural molds are arranged in the matrix in a line so that the center of each mold is located on a center line of the matrix, and that a distance between heating means and the matrix is constant at least at an edge of the matrix in a transverse direction. In this invention, such a structure prevents temperature deviations, due to differences of distances from the heating means to the mold surface of the mold, from occurring as much as possible, and the structure consequently can simultaneously mold plural glass optical elements having a good surface precision and a good surface quality. The matrix in the longitudinal form preferably has opposite ends in a substantially semicircle shape, from a viewpoint to make uniform heating to the molds close to the opposite ends.

The number of the molds arranged in a single matrix is not limited and can be determined in consideration of the shape, the size, and the like of the glass optical elements. From a view to the productivity and production technology, the number of the molds is preferably two or more and ten or less. The number may be ten or more as a matter of course.

With the molding apparatus according to the invention, the shape, structure, and material of the molds can be ones publicly known, and for example, what is set forth in Japanese Unexamined Patent Publication (KOKAI), Heisei No. 8-133,758 can be exemplified. More specifically, after a silicon carbide film is formed by a CVD method on silicon carbide sintered materials to be used as molds, an i-carbon film is formed by an ion plating method. Moreover, those covered with silicon, silicon nitride, tungsten carbide, cermet of aluminum oxide and titanium carbide, or diamond, refractory metal, noble metal alloy, or ceramic such as carbide, nitride, boride, oxide, or the like can be used as the molds. Particularly, a carbonic film such as the i-carbon film is advantageous in terms of mold-releasing property.

The heating means can be selected from various known devices, and the heating means is wound around the matrix as to be located in contact or non-contact with the outer periphery of the matrix during molding. The heating means is made of an induction heating means such as an induction heating coil and is preferably wound in following the shape of the matrix so that during molding the heating means is in non-contact with the outer periphery of the matrix. The induction heating means such as the induction heating coil can be selected from known means.

Use of the induction heating means as the heating means allows the temperature of the molds to quickly increase during repetitive moldings, so that the molding cycle can be advantageously made shorter. Moreover, the induction heating means, because of its good temperature reproduction capability, has an advantage that makes the temperature control precise.

With this molding apparatus according to the invention, when the heating means is an induction heating coil, a constant distance between the heating means and the matrix at least at the edges in the traverse direction of the matrix allows the energy from the induction heating coil to be uniformly transmitted to the matrix, thereby making uniform heating of the molds realized. An arrangement of the molds in which the center of each mold is located on a center line of the matrix, which extends in a longitudinal form and has a constant width, allows heat profile of the matrix given from heat of the induction heating coil to be symmetric on both side with respect to the longitudinal direction. Moreover, an arrangement of the molds in which the molds are arranged in the matrix in a line in a longitudinal direction as spaced from each other with a constant interval, can make heat amounts transmitted from the matrix uniform among the molds.

Upon satisfaction of the above requirements, the molding apparatus can manufacture glass optical elements having a good surface precision and a good surface quality by press molding where the plural molds are uniformly heated, especially even where the heating means is made of the induction heating coil.

Figure 9:
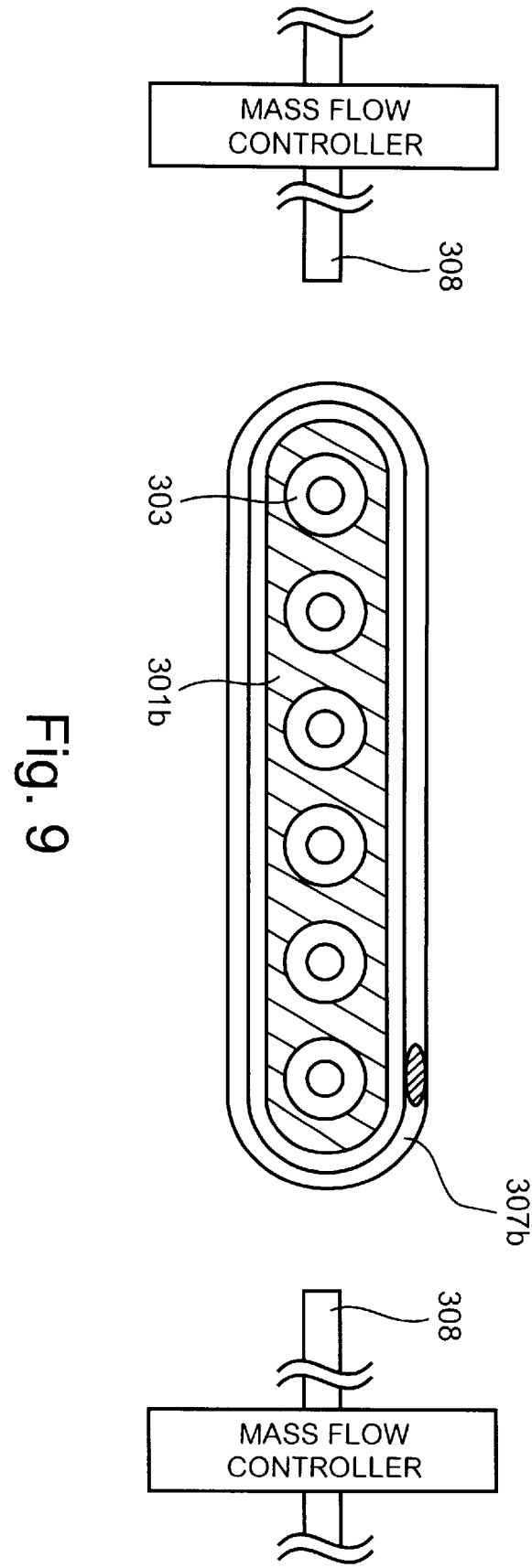
FIG. 9 is a top view showing a press molding apparatus according to the invention.

The invented press molding apparatus, since uniformly heating the molds by the induction heating coil, may be provided with a means for blowing gas from one side or both sides of the matrix in the longitudinal direction. FIG. 9 shows a situation that a means 308 for blowing gas to both sides of the molds 301*b* in the longitudinal direction is formed. The gas to be blown to the molds is not specifically limited; for example, an inert gas such as nitrogen gas can be used.

Figure 10:
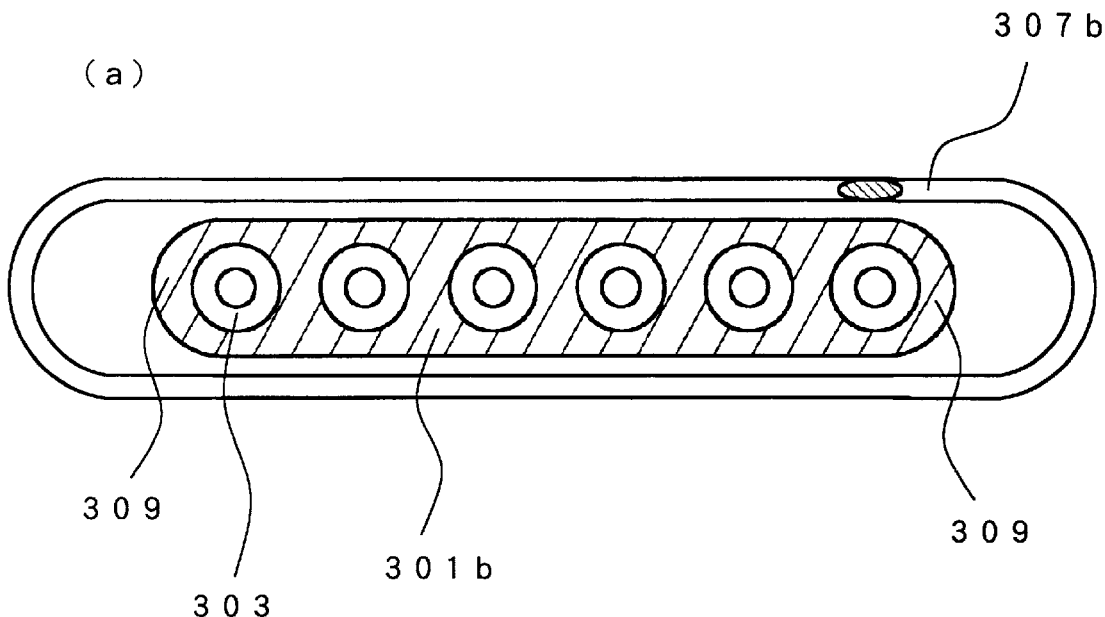
FIGS. 10(a) and 10(b) is a top view showing a press molding apparatus according to the invention.
Figure 10:
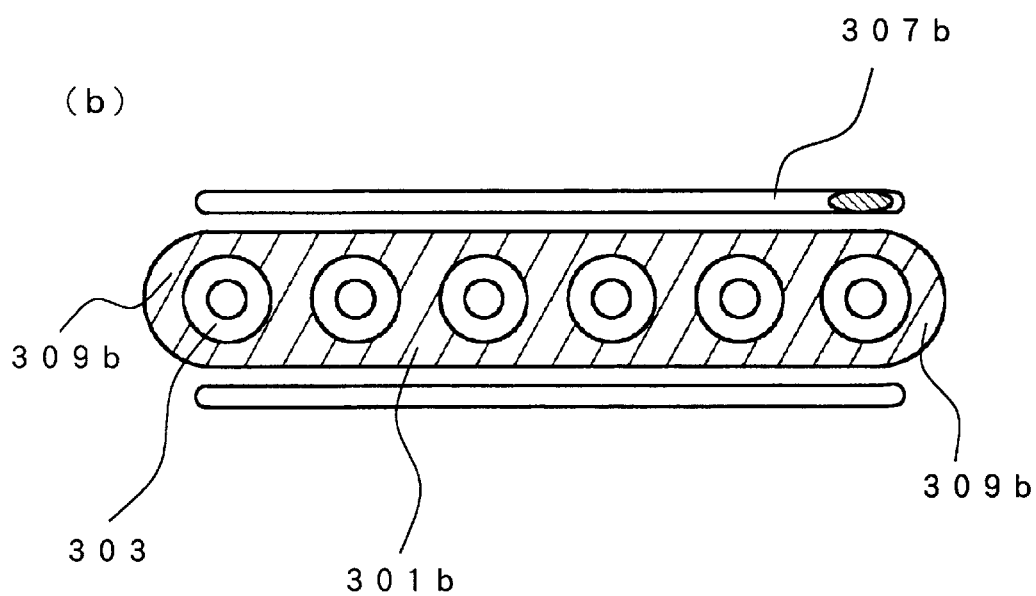

With the invented press molding apparatus, the induction heating coil as the heating means can be wound in following the shape of the matrix so to be located in non-contact with the outer periphery of the matrix. FIG. 10 shows such an example in an illustrative manner. For example, the distance between the heating means and the matrix at the edge in the longitudinal direction can be set larger than the distance between the heating means and the matrix at the edge in the transverse direction. FIG. 10(*a*) shows a structure that an induction heating coil 307*b* is placed remotely from the matrix near an end of the matrix in the longitudinal direction to keep the end 309*b* of the matrix in the longitudinal direction unheated. FIG. 10(*b*) shows a structure that induction heating coils 307*b* are arranged only at the edge except ends 309*b* of the matrix in the longitudinal direction. This structure enables molds near the ends in the longitudinal direction and at the center to be uniformly heated. In the case shown in FIG. 10(*b*), two induction heating coils can be made of a single circuit or two circuits to be thermally controlled.

Figure 11:
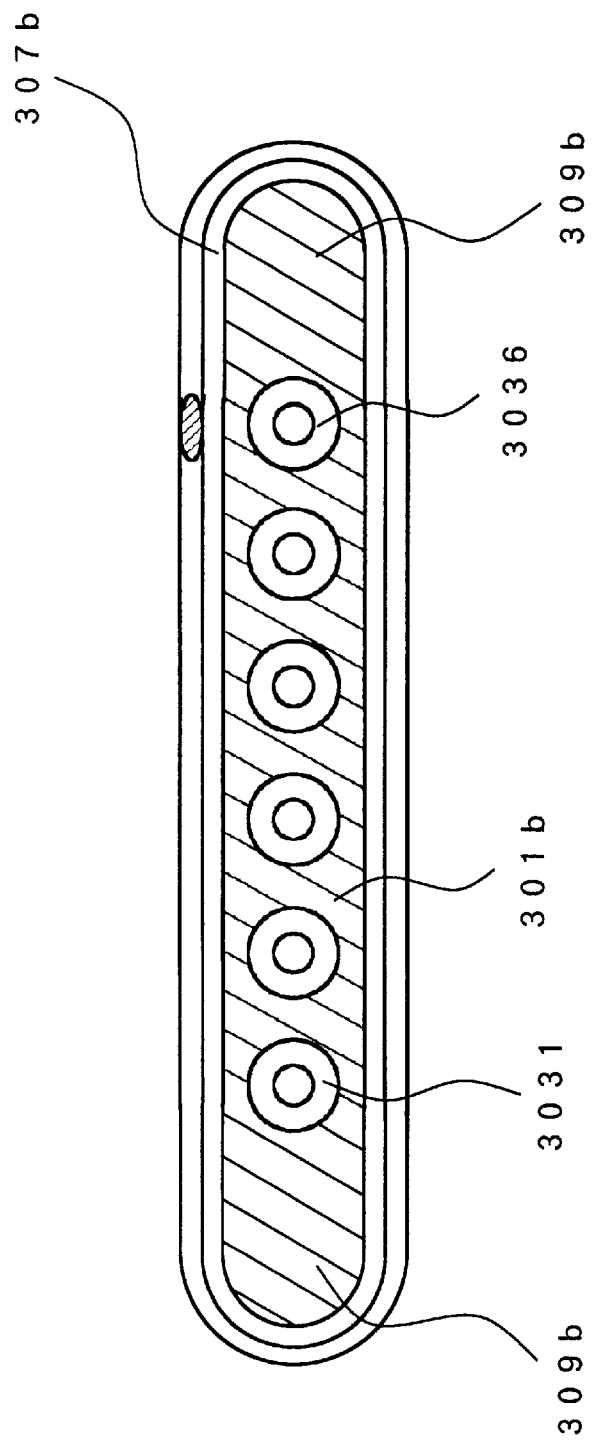
FIG. 11 is a top view showing a press molding apparatus according to the invention.
Figure 12:
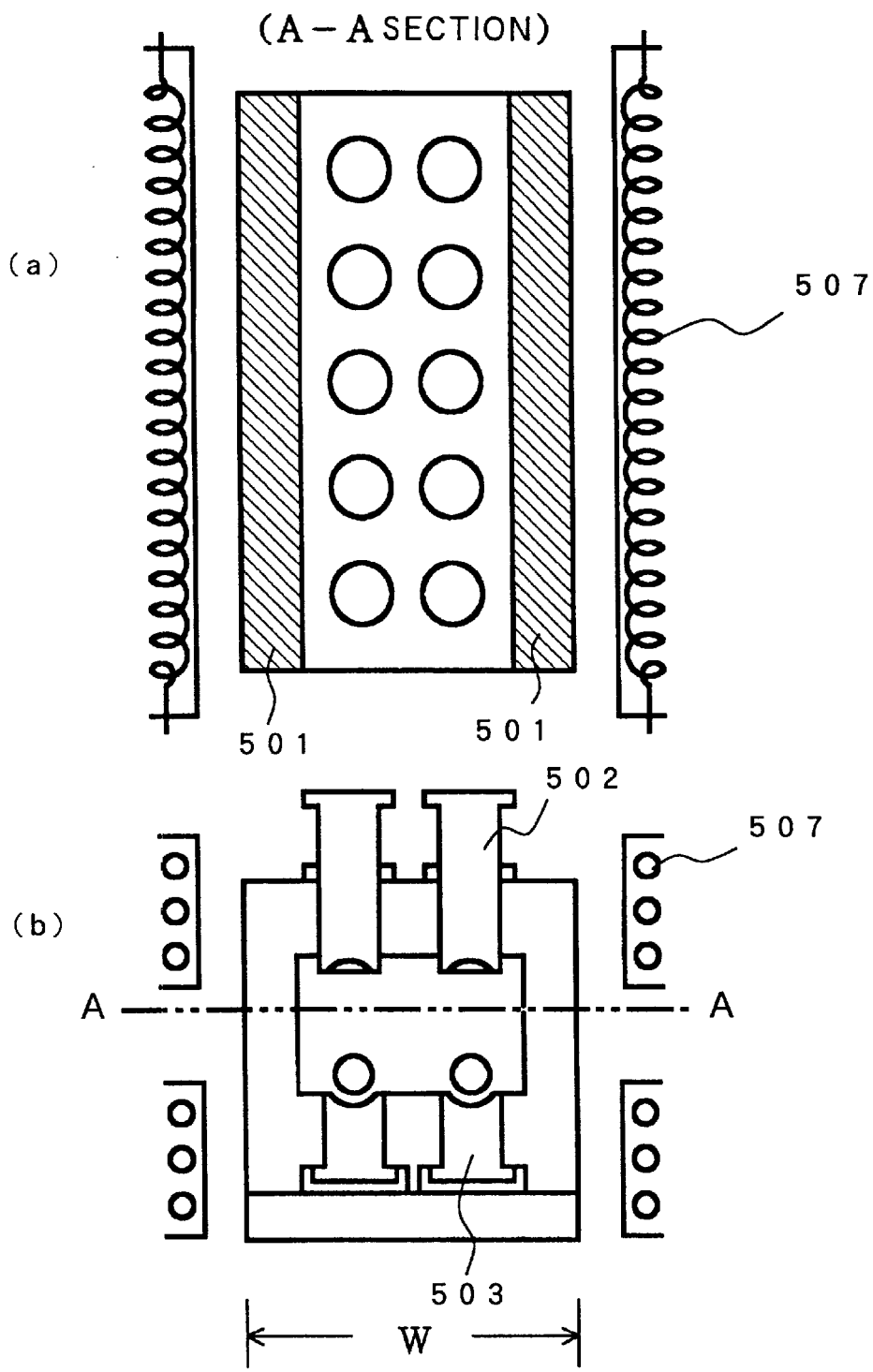
FIGS. 12(a) and 12(b) is a view showing a conventional press molding apparatus.

From the same ground, the width of the matrix from a point contacting the mold to the edge can be set larger in the longitudinal direction than in the transverse direction of the matrix. FIG. 11 shows this structure. In FIG. 11, by designing the ends 309*b* of the matrix in the longitudinal direction to be longer, the heat of the matrix heated by the induction heating coil 307*b* may be not easily transmitted to the molds 303*l*, 303*b* on both sides. It is to be noted that although the description based on the above drawings is for the lower molds, the same description is applicable to the upper molds.

In the matrix in the longitudinal form, a single piece of the matrix can support the upper and lower molds, or the matrix can be divided into an upper half matrix for supporting the upper molds and a lower half matrix for supporting the lower molds. When the single piece matrix supports the molds, at least one of the upper and lower molds is movable up and down with respect to the matrix. In such a case, where the matrix is mounted on a lower shaft of a press machine, press operation can be performed by pushing the top faces of the upper molds by a press head attached to an upper shaft of the press machine. In the case where the matrix is divided into the upper and lower half matrices, press operation can be performed by fixing the upper and lower half matrices to upper and lower shafts of a press machine, respectively, at least one of which is movable up and down.

The induction heating coil is placed at a position where the matrix is located at a time of molding, and when the matrix is separable to the upper and lower half matrices, two induction heating coils are desirably provided around the matrices, respectively. The upper and lower coils are preferably disposed with a proper space between them to allow smooth supply of a material to be molded and smooth ejection of molded articles.

The heating means may be placed as to respectively heat the upper molds and the lower molds while the upper matrix and the lower matrix are separated. It is possible to heat the upper molds and the lower molds to different temperatures while the upper matrix and the lower matrix are separated.

In this case, a heating means (induction heating coil) may be arranged to each matrix. Alternatively, an induction heating coil may be wound around both the upper matrix and the lower matrix. In the former case, the distance between the coils should be relatively big. However, in the latter case, the heating position of the upper matrix may be brought closer to that of the lower matrix and a transfer distance from a heating position to a press position can be made short. So, it is preferable in the case where glass material pieces supplied onto molds should be press molded immediately.

It is to be noted that the material of the matrix supporting the molds can be made of a known material or materials. The material of the matrix for supporting the molds is made of e.g., stainless alloy, cast iron, tungsten alloy, and molybdenum alloy, etc.

In the invented apparatus, sleeves for preventing centers of the upper and lower molds from shifting are preferably provided at any of the upper and lower molds and the upper and lower half matrices. In a desirable structure, for example, where a sleeve member is mounted on the outer periphery of each lower mold, each upper mold can be inserted in the inner side of the sleeve member.

The invented molding apparatus can be formed with a separable mold plate to simultaneously feed a glass material piece to each mold. The separable mold plate can have a small hole to make the glass material piece floating by blowing gas upward. Such a separable mold plate for floating the glass material pieces is exemplified as a floating jig as disclosed in Japanese Unexamined Patent Publication (KOKAI), Heisei No. 8 - 133,758.

The invented molding apparatus is further described in detail in the embodiments.

The molding method according to invention is a molding method for optical elements including a step of simultaneously pressing plural glass material pieces softened by heat with a plurality of molds, constituted of upper and lower molds, arranged in a matrix in a longitudinal form, in a line extending in a longitudinal direction. The shape, structure, material, and the like of the molds used for the invented molding method, and the molding conditions, and so on, can be known ones. For example, disclosed in Japanese Unexamined Patent Publication (KOKAI), Heisei No. 8 - 133,758 can be exemplified.

When the plural glass material pieces softened by heat are pressed simultaneously with the plural molds, it is preferably to set that the thermal condition is identical among the molds and that the temperature of the molding surface is identical at the same distance from the center of the molding surface in the respective molds.

In the invented molding method, since the plural molds are arranged in a matrix in a longitudinal form, in a line extending in a longitudinal direction, and since each mold is heated by heat transmission from the matrix heated by the heating means wound around the periphery of the matrix, the thermal condition can be set to be identical among the plural molds.

Furthermore, the invented molding method has a feature that each mold is heated by thermal conductance from the matrix heated by heating means wound around the matrix, to heat at least substantially equally two opposite positions in a horizontal cross section of each mold.

As a molding apparatus to enable such heating of the molds, exemplified is the molding apparatus according to the invention. That is, an apparatus can be used in which a matrix extends in a longitudinal form and has a constant width, in which plural molds are arranged in the matrix in a line in a longitudinal direction as spaced from each other with a constant interval so that the center of each mold is located on a center line of the matrix, and in which a distance between heating means and the matrix is constant at least at an edge of the matrix in a transverse direction.

The heating means is preferably made of an induction heating coil from a view that the induction heating coil can further uniformly heat up the matrix. Each mold is surrounded by the matrix and heated by thermal conductance from the matrix. If two opposite positions in a horizontal cross section with respect to each mold are different in heat transmitted from the matrix, it is difficult to obtain glass optical elements having good surface precision and quality because a temperature profile or temperature differences occur at the same distance from the center of the molding surface of the mold. With the molding method according to the invention, the molds are so heated that two opposite positions in a horizontal cross section of each mold is substantially equally heated. Such a heating system for the molds suppresses, as mush as possible, temperature deviations among positions located at the same distance from the center of the molding surface of each mold, and consequently, can simultaneously mold plural glass optical elements having a good surface precision and quality.

From a view to making the thermal conditions identical among the plural molds, a gas may be blown from one side or both sides in the longitudinal direction of the matrix during heating of the molds to uniformly heat the molds by the induction heating coil. The gas to be blown to the molds is not specifically limited, and for example, an inert gas such as nitrogen gas can be used. Moreover, use of an apparatus shown in FIG. 10 or FIG. 11, allows uniformly heating of the plural molds.

When the molds are not heated uniformly and the temperatures of the molds are different each other, temperatures of matrices are partially controlled in order to reduce the ununiformity of the temperatures. It is effective that the temperatures of the matrices are controlled to reduce the heat conducting to a mold(s) with relatively high temperature.

For example, in general, as a portion at an edge of the matrix in the longitudinal direction has a tendency to have a higher temperature, molds located at the edge of the matrix also have a tendency to have a higher temperature. In such a. case, a gas with a temperature lower than that of the portions may be blown to the portions from the longitudinal direction to reduce the ununiformity of the mold temperatures. If temperatures of molds other than those at an edge of the matrix also exhibit ununiformity, the temperatures of the matrices may be controlled to reduce the heat conducting to a mold(s) with relatively high temperature. It is also possible to increase the temperature of a portion with relatively low temperature by blowing a gas with a temperature higher than that of the portion. If necessary, it is also possible to blow a gas from the transverse direction.

According to the present method, it is possible to shorten a cycle time since molds are heated substantially uniformly within a short time by reducing ununiformity of temperatures of molds.

Controlling of temperature is conducted by adjusting a temperature or an amount of a blowing gas. Particularly, it is advantageous to precisely control the temperature to quickly establish uniformity of the temperatures. For example, the amount of a blowing gas can be precisely controlled by a mass flow controller.

The press molding according to the invention can be done by the steps of induction heating after the molds are placed in the induction heating coil upon drive of the upper and/or lower shaft of the press machine and further pressing the upper and lower molds by drive of the upper and/or lower shaft.

The glass material pieces can be softened by heat after supplied to the molds, and more preferably, the glass material pieces are supplied to the molds while softened by preheating. Where the pieces are supplied to the molds while softened by heat, the molds are preferably preheated.

In the invented molding method, in which the glass material pieces softened by preheating are supplied to the molds, it is preferable to set the glass material pieces that are supplied to the molds, at a higher temperature than the temperature of the molds, in terms of capability of manufacturing, with relatively short cycle time, glass optical elements free from surface defects.

For example, the glass material can be softened by heating the material at a temperature corresponding to the glass material's viscosity less than $10^9$ poises. Where the viscosity of the glass material is less than $10^9$ poises, the glass material can be molded upon adequate transformation of the material using the molds preheated at a temperature corresponding to the glass material's viscosity equal to or more than $10^9$ poises. To mold the material where the temperature of the molds is set a relatively low temperature, it is appropriate to soften the glass material by heating the material at a temperature corresponding to, preferably, $10^{5.5}$ to $10^{7.6}$ poises.

The preheating temperature of the molds can be a temperature corresponding to $10^9$ to $10^{12}$ poises as a viscosity of the glass material. If the temperature is less than a temperature corresponding to a viscosity of $10^{12}$ poises, it is difficult to expand the glass material largely and to obtain a glass molded item having a thin edge thickness, as well as hard to obtain a high precision on the surfaces. If the temperature is more than a temperature corresponding to a viscosity of $10^9$ poises, the cycle time for molding becomes longer than needed, and the life of the molds becomes short.

It is more preferred that the preheated glass material pieces are supplied to the preheated molds and are press molded immediately after the pieces are supplied. In this case, if there were ununiformity of temperatures between the molds, press molding would be done under different conditions between the molds and optical materials with substantially the same form could not be obtainable. So, it is preferred that molds have been heated uniformly just before the preheated glass material pieces are supplied thereto.

The supply of the glass material pieces to the molds can be done by a known supply means such as sucking pads or the like. When the glass material pieces are supplied while softened by heating, a floating plate, and preferably, a separable floating plate can be used. For example, a glass material can be supplied by carrying plural glass material pieces softened by heat on plural separable floating plates arranged in a line in the longitudinal direction on a support arm in making the glass material pieces floating by air flows blown from each bottom of the glass material pieces and by dropping the glass material pieces upon separating each separable floating plate at a position right above each lower mold. Such a floating plate can be exemplified in Japanese Unexamined Patent Publication (KOKAI), Heisei No. 8-133,758.

It is preferred that the feeding of multiple pieces of a glass material to the plurality of molds is done by dropping the pieces on the molds at the same time. By dropping the pieces on the molds at the same time, a cycle time can be shortened. In the case where glass material pieces are press molded by molds having a temperature different from that of the glass material pieces, it is possible to adjust the molds to exhibit the same temperature.

It is not easy to prevent a jig for holding the glass material and the glass from adhering to one another during heating where the glass material is in a low viscosity region such that the glass material may deform by its weight. Gas layers are formed on the jig surfaces and the entire surface of each glass material piece when the glass material pieces are made floating by air flows using the floating plates in which the gas is blown out of the jig, thereby making possible softening the glass material by heat without reacting the glass material with the jig. When the glass material piece is a preform, the material can be softened by heat while the shape of the preform is almost preserved. When the glass material is a glass gob which has an irregular shape with surface defects such as wrinkles on the material surface, the shape may be regulated and the surface defects may be eliminated, by making the glass material floating by the air flow while the material is softened by heat.

The gas forming the air flow used for floating the glass material is not specifically limited. It is preferable to use a non-oxidizing gas, and for example, nitrogen may be appropriate, from a viewpoint that the heated glass material does not react with the jig and that impairment of the jig due to oxidization of the heated jig is to be prevented. A reducing gas, such as hydrogen gas, may be added to the gas.

The flow amount of the air flow is changeable in consideration of the shape of an air outlet, and the shape and weight of the glass material, etc. A gas flow in a range of 0.005 to 20 liter per minute is generally appropriate for floating the glass material. If the gas flow is less than 0.005 liter per min, the glass material may not be floated adequately where the glass material has a weight of 300 mg or more. If the gas flow exceeds 20 liter per minute, the glass on the floating plate jig may be staggered even where the glass weight is 2000 mg or more, thereby rendering the glass shape possibly deform during heating where the glass material is a perform.

The condition for softening the glass material by heat can be changed properly depending on types of the glass, and so on, and is adjusted so that the softened glass has a required viscosity.

Floating of the preform by air flow can be done by air flow flowing upward out of an upper opening having, e.g., a diameter smaller, equal, or larger than the diameter of the preform.

Moreover, where the separable floating plates are used as described above, the glass material piece may be dropped through an opening of a funnel member disposed between the floating plate and the lower mold for preventing the center of the piece from shifting in its position, to render the piece dropped onto the center of the lower mold without shifting of the center position.

A guide means may operate to correct positional shifts of the centers of the glass material pieces by pushing the glass material pieces, to correct positional shifts of the glass material pieces that have dropped on the lower molds from the centers of the lower molds.

As a shape of the glass material pieces applicable to the invented molding method, exemplified are, e.g., a spherical shape, a slightly flatted spherical shape, and so on. There is no special limitation on shapes or the like of the obtained optical elements depending on materials or molding of the glass material pieces. As a glass optical element obtained by this invented molding method, e.g., a spherical or aspherical biconvex lens, convex meniscus lens, or concave meniscus lens, and the like are exemplified.

With the molding method according to the invention, there is no limitation on the conditions and the like of press molding, which can be determined properly in consideration of temperatures of the glass material and molds, etc. The glass material can be molded, normally, under a pressure of 30 to 200 kg/cm$^2$ for 3 to 60 seconds, preferably, 5 to 30 seconds. Temperatures of the preform or gob, molds, and molding releasing can be selected properly.

Embodiments

Referring to the drawings, hereinafter, the apparatus and method according to the invention is described from embodiments.

Embodiment 1

Figure 2:
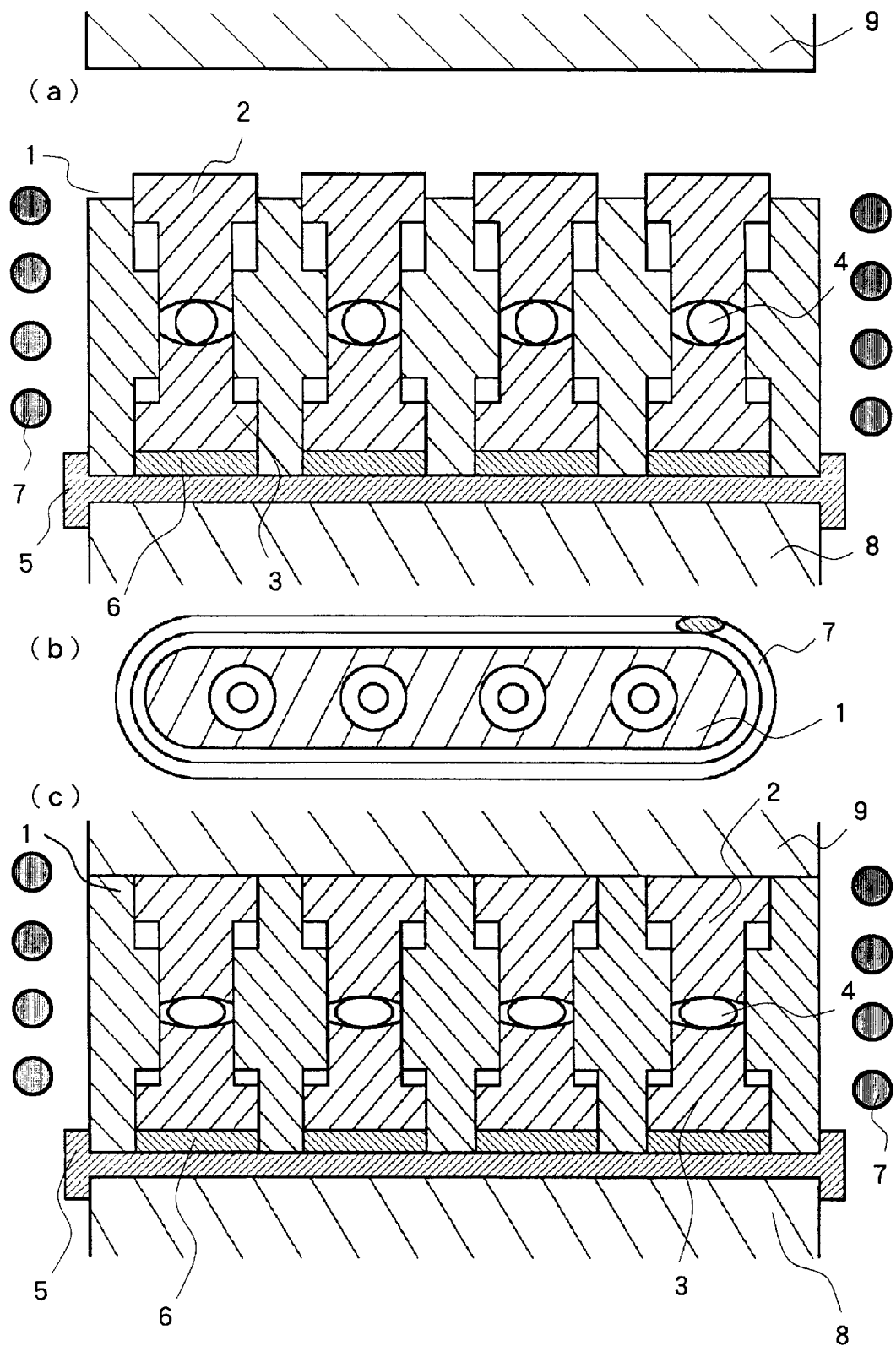
FIGS. 2(a), 2(b) and 2(c) is an illustration showing a state of the press molding apparatus in FIG. 1 while molding.

FIG. 1 is a cross section showing an assembled state of upper molds, lower molds, and a matrix of a press molding apparatus according to this embodiment. The press molding apparatus of this embodiment, as shown in FIG. 1, uses molds constituted of four sets of an upper mold 2 and a lower mold 3 supported movably up and down by a matrix 1. The upper mold 2 and the lower mold 3 are made of a super hard alloy, and molding surfaces are covered with a noble metal thin film. The matrix 1 is made of a tungsten alloy and has a slightly larger thermal expansion coefficient than that of the super hard alloy. Numeral 5 is a tray for carrying the matrix 1 having the upper and lower molds 2, 3 into a press molding chamber. Numeral 6 is a spacer provided at the bottom of the lower mold to make the thickness of the molded articles constant in respective molds by adjusting the thicknesses corresponding the sizes of the molds. The press molding apparatus of this embodiment, as shown in FIG. 2, has an upper main shift 9 and a lower main shaft 8 serving as pressing means for pressing the upper and lower molds, and an induction heating coil 7 for performing induction heating during molding. The induction heating coil 7 is wound in a form to surround the matrix in the longitudinal form.

Biconvex lenses having an outer diameter of 15 mm were molded by the above molding apparatus using spherical preforms 4 made of barium borosilicate glass (transition point 514° C., sag point 545° C.).

First, the spherical preforms 4 were placed between the upper and lower molds 2, 3 in the matrix 1, and the matrix 1 was mounted on the tray 5 and placed on the lower main shaft 8 of the molding apparatus together with the tray 5 after inserted in the molding apparatus in which an inert gas atmosphere was maintained. The lower main shaft was then elevated to dispose the lower molds 3 inside the induction heating coil 7 of the molding apparatus (FIG. 2(a), (b)). A high frequency generator was powered on to inductively heat the matrix 1 made of tungsten, and after the glass material pieces were heated up at 596° C. (temperature corresponding to a glass viscosity of 10$^8$ poises), the lower main shaft was further moved up to press the softened preforms by pushing the top of the upper molds to a head 9 of the upper main shaft (FIG. 2(c)). After the material pieces were cooled down to the glass transition point or below, the lower main shaft was move down, and the molded articles were removed out of the molding apparatus together with the molds.

The temperature profile on the molding surfaces of the respective molds was very good. The lens indicated nothing that the lens expanded irregularly and was made without irregularity in having a good surface precision.

Embodiment 2

Figure 3:
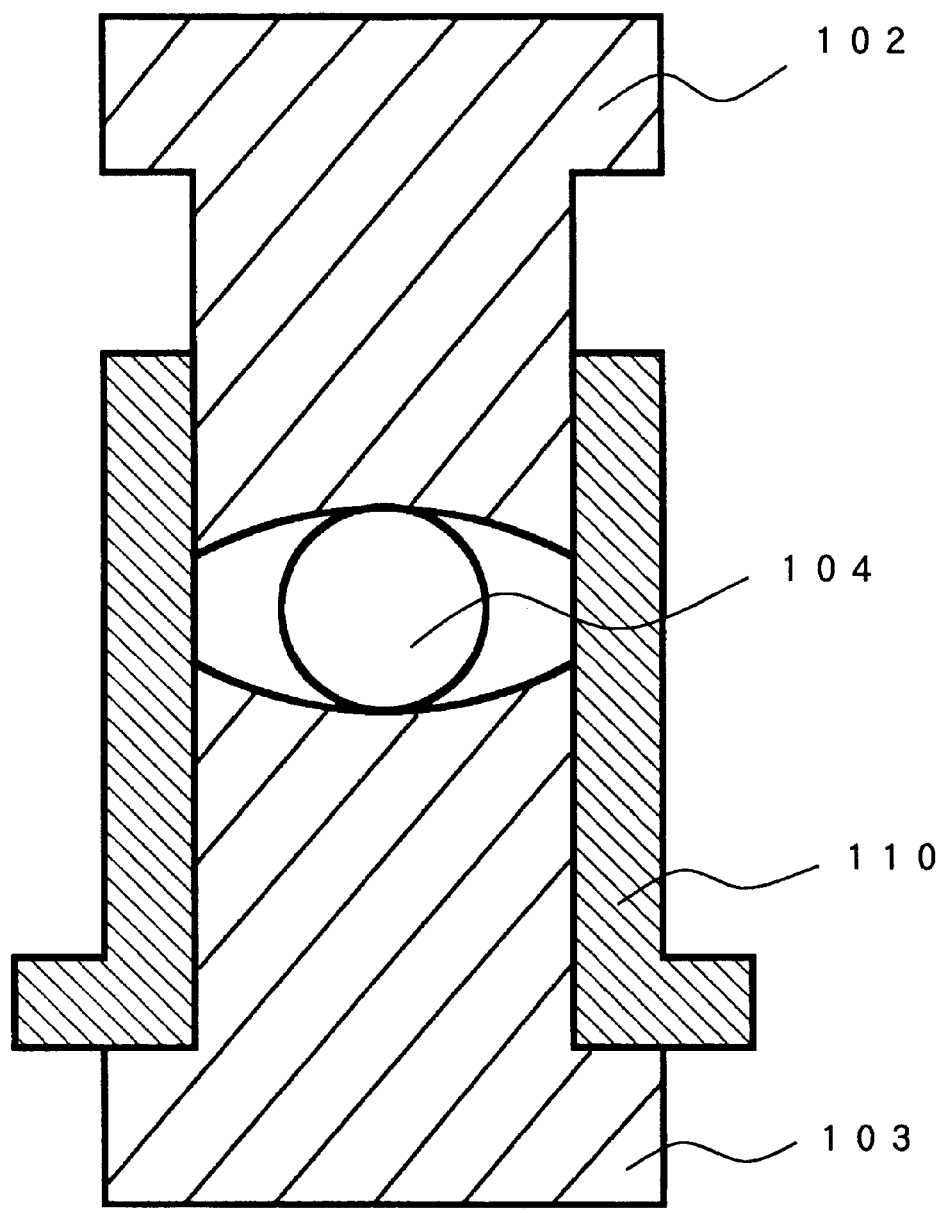
FIG. 3 is a cross section showing an assembled state of a press molding apparatus according to another embodiment of the invention.

Biconvex lenses substantially the same as those in Embodiment 1 were molded using a molding apparatus substantially the same as that in Embodiment 1 except that the upper and lower molds were made of silicon carbide whose molding surface is covered with a carbonic thin film and that, as shown in FIG. 3, a sleeve 110 was provided on the outer periphery of each lower mold 103. The sleeve 110 was for preventing the centers of the upper and lower molds from shifting by fitting to the upper molds 102 when pressed as well as for forming a side face of the lenses. The sleeve 110 was covered with a carbonic thin film on silicon carbide same as the upper and lower molds. When a molding was done in the substantially the same condition as in Embodiment 1, a lens having a higher precision than that of Embodiment 1 was formed, because the mold had a better temperature profile on the molding surface where the sleeve of a good thermal conductance surrounded the outer periphery of the upper and lower molds.

Embodiment 3

Figure 4:
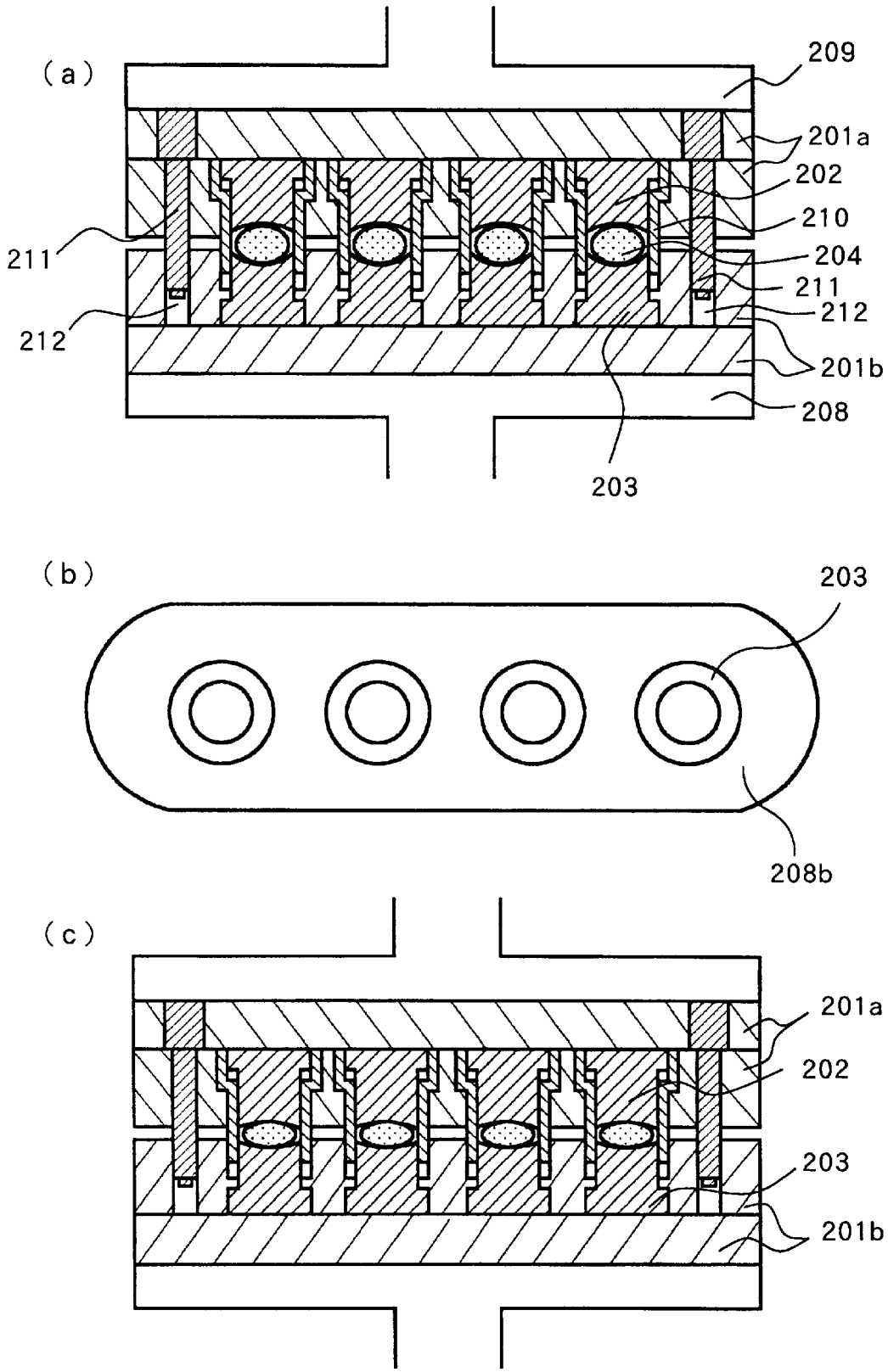
FIGS. 4(a), 4(b) and 4(c) is an illustration showing a state of the press molding apparatus while molding according to another embodiment of the invention.

In this molding apparatus according to this Embodiment, as shown in FIG. 4, an upper matrix 201a and a lower matrix 201b in a longitudinal form are attached to an upper main shaft 209 and a lower main shaft 208, respectively, of the press machine. Four each of upper molds 202 and lower molds 203 are attached to the upper and lower matrices 201a, 201b. A sleeve 210 is arranged at the outer periphery of the upper mold 202 to prevent the center of the upper and lower surfaces of the lens from shifting by slidably fitting to the lower mold with a narrow clearance. Guide pins 211 are provided on both sides of the upper matrix 201a, and guide holes 212, corresponding to the pins, are formed in the lower matrix 201b. The upper and lower matrices 201a, 201b are formed of a tungsten alloy, and the upper molds 202, the lower molds 203, and the sleeves 210 are made of substantially the same material as Embodiment 2.

Biconvex lenses (one surface is spherical; the other surface is aspherical) having an outer diameter of 15 mm were molded using this molding apparatus by pressing barium borosilicate glass (transition point 514° C., sag point 545° C.). Preforms 204 free from surface defects thermally molded into a slightly flatted spherical shape were preheated at 470° C., and four pieces of the preforms 204 were moved at once using sucking pads (not shown) on the four lower molds 203 of the lower matrix 201b preheated at about 470° C. at a lower side of the molding chamber. Then, immediately, the lower matrix 201b was moved up to be fitted in the upper mold held at 470° C. (FIG. 4a). The lower molds 203 were guided by the guide pins 211 and the guide holes 212, and the sleeves 210 fitted in the respective lower mold 203. The upper and lower matrices 201a, 201b were heated, by high frequency induction heating method, at 596° C. corresponding to the glass viscosity of 10$^8$ poises. After the matrices were heated uniformly, the lower matrix 201b was moved up to press the preforms 204 at a pressure of 70 kg/cm² (FIG. 4C). Subsequently, the molds and molded lenses were cooled down at a cooling rate of 50° C. per minute to the glass transition point or below. The upper molds 202 followed shrinkage of the glass at that time, and the preforms were cooled while only weight of the preform was exerted to the upper mold. That is, during cooling, the top face of the lens was kept in contact with the upper mold.

At each mold, heating and cooling was performed almost uniformly. The lower mold 201b was moved down at 490° C. to release the molds, and then four lenses were taken out using sucking pads upon lowering the lower matrix 201b below the molding chamber. The lenses taken out may be annealed when necessary. The obtained lenses had a high surface precision, a good surface quality, and a good eccentricity after an alignment of the center.

Embodiment 4

In the embodiment of this embodiment, a biconvex lens having a diameter of 10 mm was molded using matrices and molds having substantially the same structures as those in Embodiment 3 except that each six of upper and lower molds are mounted in respective upper and lower matrices in longitudinal forms.

Figure 6:
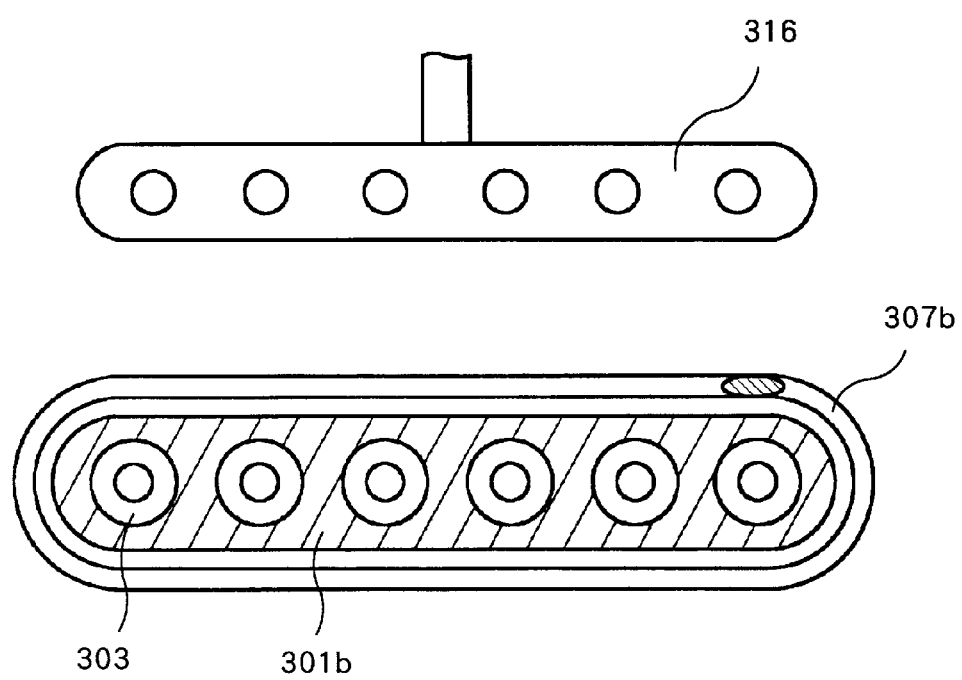
FIG. 6 is a top view showing an apparatus according to another embodiment of the invention.

With the apparatus of the embodiment, as shown in FIG. 6, induction heating coils wound in a shape following the longitudinal form of the upper matrix 301a (not shown) and the lower matrix 301b are placed at two locations (307a (not shown), 307b), or namely, around the upper matrix 301a (not shown) and the lower matrix 301b. High frequency power for the lower side is controllable, and high frequency power for the upper side can be set as variable percent of the power for the lower side. A clearance of 20 mm is formed between the upper side coil and the lower side coil.

Figure 5:
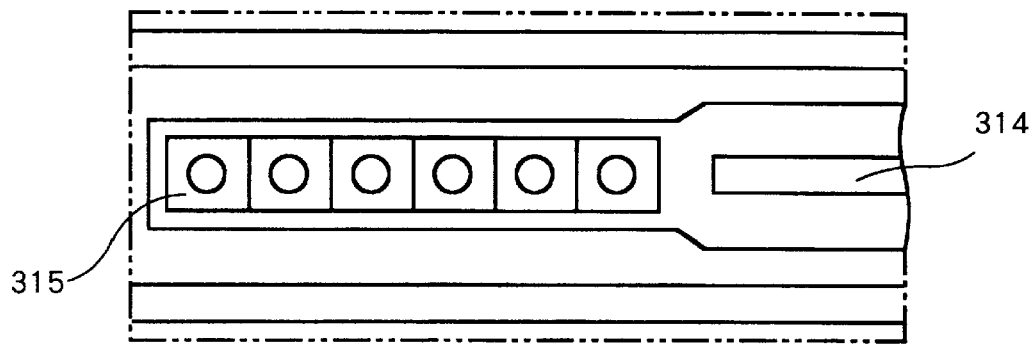
FIG. 5 is a top view showing a molding material feeding means used for another embodiment of the invention.
Figure 7:
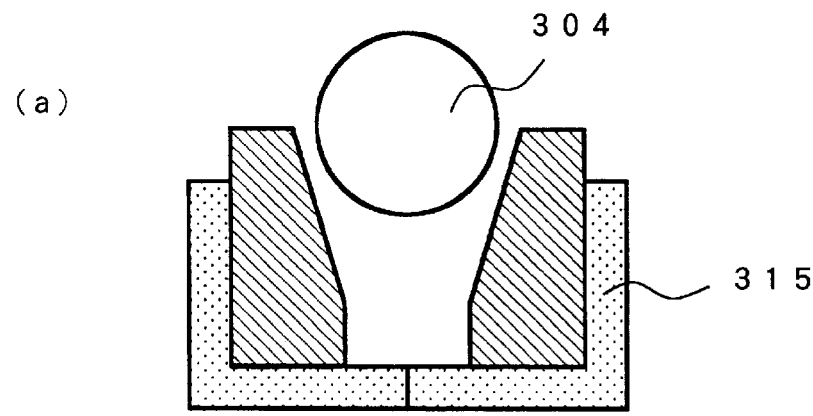
FIGS. 7(a) and 7(b) is a cross section showing the apparatus shown in FIG. 6.
Figure 7:
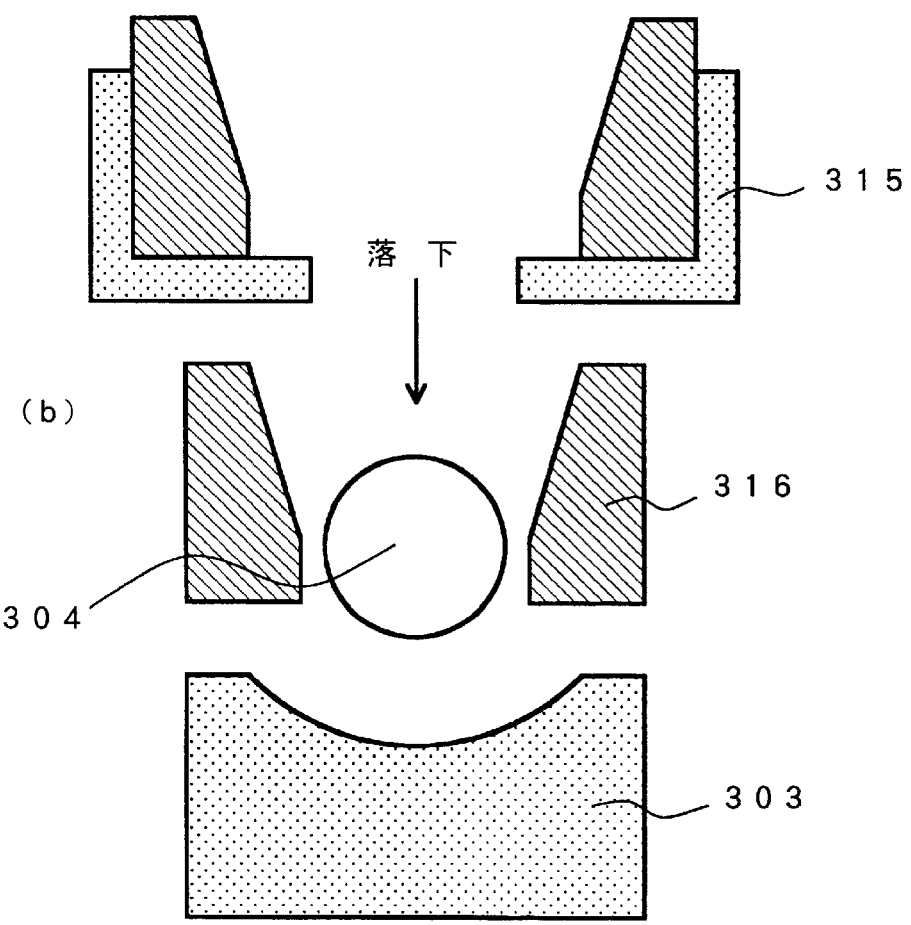

The six pieces spherical preforms 304 were softened (see, Patent Unexamined Patent Publication, Heisei No. 8-133, 758) by heat while floated by air flows blown from the lower portion on six separable floating plates 315 (made of a glassy carbon) arranged in a line (arranged in the same intervals as those of the upper and lower molds) on a support arm 314 openable shown in FIG. 5 (see, FIG. 7a). Subsequently, the support arm 314 was inserted between the upper and lower induction heating coils 307 and was opened quickly where placed right above the plural lower molds 303 to separate the plural floating plates 315 left and right, thereby supplying the plural preforms 304 on the lower molds 303 by dropping at the same time the preforms 304 from the floating plates 315 to corresponding the lower molds 303 (FIG. 7b). To ensure each preform 304 to drop on to the center of each lower mold 303 without positional shifts, it is preferable to render the preform 304 drop through a funnel type member 316, having a plane shape in FIG. 6 and a cross section in FIG. 7, between the floating plate 315 and the lower mold 303.

Then, the support arm and the funnel were immediately withdrawn from the lower mold; the high frequency power was turned down; the lower matrix was elevated to press the preforms with a pressure of 70 kg/cm². The pressure exerted to the glass material was set to only weight of the upper mold, and the glass material pieces were cooled to the glass transition point or below. Then, the lower matrix was moved down about 20 mm to release molds, and 36 pieces of molded articles were taken out at the same time by inserting the sucking pads (not shown) between the upper and lower induction heating coils. The temperatures of the upper and lower matrices were immediately returned to the press starting temperature by a high frequency power, and the subsequent molding was performed in the same manner. Table 1 shows the molding condition of this embodiment.

TABLE 1

| Press Starting Time | | |
|---|---|---|
| Preform Temperature (Viscosity) | Mold Temperature (Viscosity) | Mold-releasing Temperature (° C.) |
| 680 ($10^{5.8}$) | 549 ($10^{10.2}$) | 485 |
| 643 ($10^{6.6}$) | 567 ($10^{9.2}$) | 495 |
| 615 ($10^{7.4}$) | 590 ($10^{8.2}$) | 505 |

Temperature: ° C., Viscosity: poise

In any molding condition, lenses having a good quality were obtained successively. According to the method of the embodiment, a large number of the lenses can be produced with a very fast production speed and a high efficiency.

Embodiment 5

Figure 8:
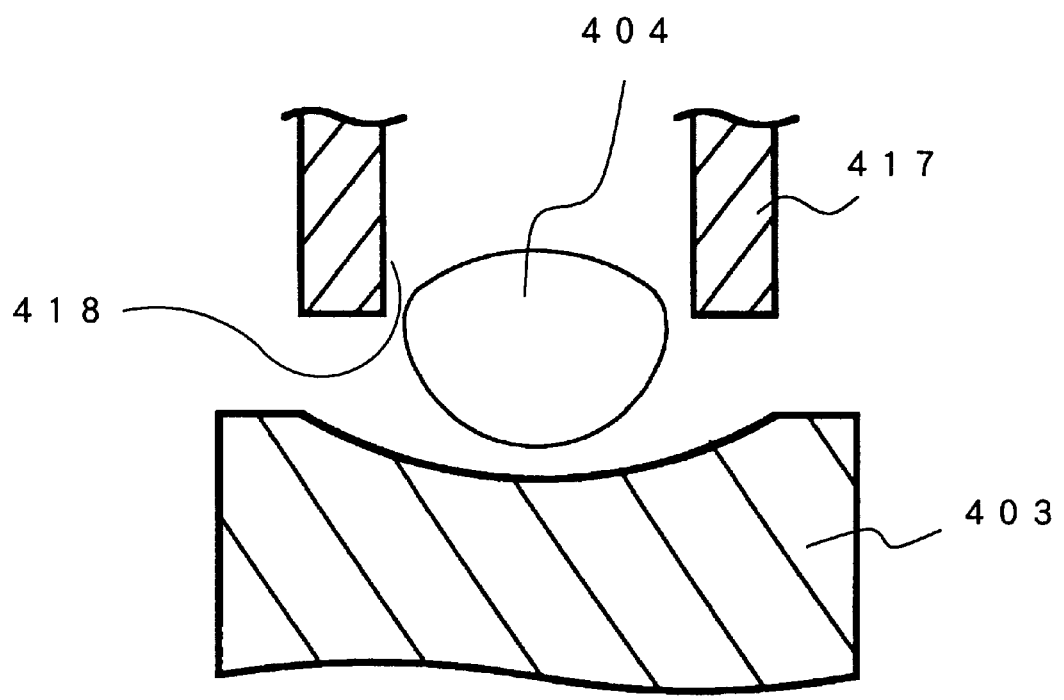
FIG. 8 is a cross section showing a molding material feeding method according to another embodiment of the invention.

In this embodiment, a preform 404 thermally molded in a slightly flatted spherical shape was used as a preform. In the case of the spherical preform, guides by the funnel during the drop as described in Embodiment 4 were very effective, but in the case of the slightly flatted spherical preform, its position may be shifted from the center of the lower mold. To correct such positional shifts of the dropped preform from the center of the lower mold, the preforms were pushed by the guide means 417. As the guide means 417, a member having a circular opening 418 with an inner diameter slightly larger than the preform diameter was used. The guide means 417 was placed to cover the preform so that the center of the opening 418 is aligned coaxially with the center of the lower mold 403 (see, FIG. 8). The member struck the edge of the shifted preform 404 to slide the preform 404 to the center position, thereby correcting the position of the preform. Then, lenses having less thickness deviations were obtained by press molding. Other conditions were the same as Embodiment 4.

In the press molding apparatus according to the invention, the plural molds are arranged in a straight line and heated by induction heating from both sides of the molds, so that the press molding is performed where the molds are uniformly heated. Therefore, this apparatus can prevent problems such as partial extension defects or the like from occurring and bring glass optical elements having a high surface precision and a high surface quality.

What we claim is:

1. A molding apparatus for glass optical elements comprising:

a plurality of molds each constituted of an upper mold and a lower mold, a matrix supporting the molds, and a heating means wound around the matrix for heating the molds, wherein the matrix extends in a longitudinal form and has a constant width, wherein the plurality of the molds are arranged in the matrix in a line so that the center of each mold is located on a center line of the matrix, and wherein a distance between the heating means and the matrix is constant at least at an edge of the matrix in a transverse direction.

2. The molding apparatus according to claim 1, wherein the heating means is an induction heating coil.

3. The molding apparatus according to claim 1, further comprising a means for blowing a gas to an edge of the matrix in the longitudinal direction.

4. The molding apparatus according to claim 3, wherein a blowing amount of a gas is controlled by a mass flow controller.

5. The molding apparatus according to claim 2, further comprising a means for blowing a gas to an edge of the matrix in the longitudinal direction.

6. The molding apparatus according to claim 1, wherein the distance between the heating means and the matrix at an edge of the matrix in the longitudinal direction is larger than the distance between the heating means and the matrix at the edge of the matrix in the transverse direction.

7. The molding apparatus according to claim 2, wherein the distance between the heating means and the matrix at an edge of the matrix in the longitudinal direction is larger than the distance between the heating means and the matrix at the edge of the matrix in the transverse direction.

8. The molding apparatus according to 1, wherein a width of the matrix in the longitudinal direction from a contact portion contacting with the mold to the edge of the matrix is larger than that in the transverse direction.

9. The molding apparatus according to 2, wherein a width of the matrix in the longitudinal direction from a contact portion contacting with the mold to the edge of the matrix is larger than that in the transverse direction.

10. The molding apparatus according to claim 1, wherein the matrix in the longitudinal form is divided into an upper matrix for supporting the upper molds and a lower matrix for supporting the lower molds, and at least either of the matrices is movable up and down.

11. The molding apparatus according to claim 10, wherein the heating means are placed as to respectively heat the upper molds and the lower molds while the upper matrix and the lower matrix are separated.

12. The molding apparatus according to claim 10, wherein a sleeve is provided at any of the upper molds, the lower molds, the upper matrix, and the lower matrix to prevent the centers of the upper and lower molds from shifting.

13. The molding apparatus according to claim 10, wherein the upper matrix and/or the lower matrix have a guide pine(s), and the lower matrix and/or the upper matrix being opposite to the upper matrix and/or the lower matrix having the guide pine(s) have a guide hole(s) to insert the guide pine(s).

14. The molding apparatus according to claim 1, further comprising a separable plate for simultaneously transferring and feeding multiple pieces of a glass material to the plurality of molds wherein the feeding is done by opening of the plate.

15. A molding method for optical elements comprising the steps of:

softening a plurality of glass material pieces by heat; and making a simultaneous press molding of the glass material pieces with a plurality of molds, constituted of upper and lower molds, arranged in a longitudinal form matrix, in a line extending in a longitudinal direction, wherein each mold is heated by thermal conductance from the matrix heated by heating means wound around the matrix, to heat substantially equally two opposite positions in a horizontal cross section of each mold.

16. The molding method according to claim 15, wherein the heating means is an induction heating coil.

17. The molding method according to claim 15, wherein the glass material pieces are supplied to the molds and heated together with the molds by the heating means so that two opposite positions in a horizontal cross section of each mold are substantially equally heated at least when the press molding is started.

18. The molding method according to claim 17, wherein in addition to the heating by the heating means, the temperature of the matrix is controlled so that temperatures of the molds are substantially equal to each other at least when the press molding is started.

19. The molding method according to claim 16, wherein the glass material pieces are supplied to the molds and heated together with the molds by the heating means so that two opposite positions in a horizontal cross section of each mold are substantially equally heated at least when the press molding is started.

20. The molding method according to claim 15, wherein the glass material pieces softened by preheating are supplied to the molds heated by the heating means, provided that the heating of the molds are conducted so that the temperature of the softened glass material is higher than the temperature of the heated molds and two opposite positions in a horizontal cross section of each mold are substantially equally heated at least when the press molding is started and then pressed to mold the optical elements.

21. The molding method according to claim 20, wherein in addition to the heating by the heating means, the temperature of the matrix is controlled so that temperatures of the molds are substantially equal to each other at least when the press molding is started.

22. The molding method according to claim 16, wherein the glass material pieces softened by preheating are supplied to the molds heated by the heating means, provided that the heating of the molds are conducted so that the temperature of the softened glass material is higher than the temperature of the heated molds and two opposite positions in a horizontal cross section of each mold are substantially equally heated at least when the press molding is started and then pressed to mold the optical elements.

23. The molding method according to claim 15, the feeding of multiple pieces of a glass material to the plurality of molds is done by dropping the pieces on the molds at the same time.

24. The molding method according to claim 23, wherein the glass material pieces are dropped onto the lower molds through funnel members which have the same number of openings as the number of molds and are placed between the floating plates and the lower molds to prevent the centers of the glass material pieces from shifting.

* * * * *